United States Patent [19]

Komei

[11] Patent Number: 4,894,717
[45] Date of Patent: Jan. 16, 1990

[54] DELIVERED ARTICLE STORAGE CONTROL SYSTEM

[75] Inventor: Yutaka Komei, Osaka, Japan

[73] Assignee: Kabushiki Kaisha Fulltime System, Osaka, Japan

[21] Appl. No.: 328,623

[22] Filed: Mar. 27, 1989

[30] Foreign Application Priority Data

Mar. 28, 1988 [JP] Japan .................................. 63-40980
Mar. 8, 1989 [JP] Japan .................................. 64-27053

[51] Int. Cl.⁴ .............................................. H04N 7/18
[52] U.S. Cl. ...................................... 358/108; 358/85
[58] Field of Search ............................ 358/108, 93, 85

[56] References Cited

U.S. PATENT DOCUMENTS 3,564,132  2/1971  Baker .................................. 358/108
3,612,764  10/1971 Gilkeson ............................. 358/108
3,701,100  10/1972 Yarbrough .......................... 358/108
4,462,045  7/1984  Norris .................................. 358/93
4,581,634  4/1986  Williams ............................. 358/108

Primary Examiner—Howard W. Britton
Attorney, Agent, or Firm—Koda & Androlia

[57] ABSTRACT

A delivered article storage control system comprising a control box equipped with a receipt issuing printer, an instruction display and/or a speaker, a card reader, a monitor display and an input keyboard, a delivered article storage box equipped with a plurality of lockers, each of which is equipped with a door which can be opened when an identification card is entered into the card reader and an article presence/absence detection sensor, and a control unit which controls the above devices. The system is installed in a visitor reception room and connected to a control room equipped with a monitor display through a telephone line, and delivered article receiving and storing processes (including a receipt issuing process) can be conducted accurately and safely for 24 hours a day without the help of any third person, such as a janitor.

5 Claims, 9 Drawing Sheets

Entering delivered article into locker
(1) Input display for delivery service person
 (1) Room number input display

```
Input the receiver's room number using the
number keys.
Room number  _______
Receiver's name  _______
If the input number is correct, press the
confirmation key. If wrong, press the
correction key.
```

↓

Input of the receiver's room number

```
Input the receiver's room number using the
number keys.
Room number  _______
Receiver's name  _______
If the input number is correct, press the
confirmation key. If wrong, press the
correction key.
```

↓

Confirmation or correction

↓

To (2)

(2) Delivery service company code input display

Input the code number of your delivery service company by pressing the corresponding number key.

| 1 Post office | 2 Yamato | 3 Nittu |
|---|---|---|
| 4 Seibu | 5 Mitsukoshi | 6 Matsuya |
| 7 Tokyu | 8 Kintetsu | 9 Hankyu |
| 10 Hanshin | 11 Takashimaya | 12 Daimaru |

Number _______

If the input number is correct, press the confirmation key. If wrong, press the correction key.

---

Input of the code number of your delivery service company

---

Input the code number of your delivery service company by pressing the corresponding number key.

| 1 Post office | 2 Yamato | 3 Nittu |
|---|---|---|
| 4 Seibu | 5 Mitsukoshi | 6 Matsuya |
| 7 Tokyu | 8 Kintetsu | 9 Hankyu |
| 10 Hanshin | 11 Takashimaya | 12 Daimaru |

Number _______

If the input number is correct, press the confirmation key. If wrong, press the correction key.

①
↓

| Confirmation or correction |
|---|

Locker condition display

| Input the corresponding locker number using the number key. |
|---|
| <table><tr><td></td><td></td><td>3</td><td>4</td><td>5</td></tr><tr><td>6</td><td>7</td><td>8</td><td>9</td><td>10</td></tr><tr><td>11</td><td></td><td></td><td></td><td></td></tr></table> Locker number _______ <br> If the input number is correct, press the confirmation key. If wrong, press the correction key. |

↓

| Locker number input |
|---|

↓

| Input the corresponding locker number using the number keys. |
|---|
| <table><tr><td></td><td></td><td>3</td><td>4</td><td>5</td></tr><tr><td>6</td><td>7</td><td>8</td><td>9</td><td>10</td></tr><tr><td>11</td><td></td><td></td><td></td><td></td></tr></table> Locker number _______ <br> If the input number is correct, press the confirmation key. If wrong, press the correction key. |

Taking out delivered article by resident

```
Enter the identification card into the card reader.
```
↓
```
The door is unlocked.
Take out the delivered article and securely close the door.
Thank you.
```
↓
```
Securely close the door.
```

DELIVERED ARTICLE STORAGE CONTROL SYSTEM

BACKGROUND OF THE INVENTION

1. Field of the Invention

The present invention relates to a delivered article storage control system mainly installed at multiple dwelling houses, such as condominiums, for convenience of residents. This system is also installed at office buildings and tenant buildings. When a resident is out, the system receives and securely stores an article delivered to the resident from a department store, a supermarket or a laundry. When the resident returns home, he can take out the article from the system.

2. Prior Art

A conventional system consists of a delivered article storage box which has a plurality of delivered article storage lockers and an identification card reader. Such a box is installed at the visitor reception room or entrance hall of a multiple dwelling house. Each resident is provided with a registered identification card, such as a magnetic card. When the resident enters his identification card into the card reader of the above-mentioned delivered article storage box, he can open the door of his delivered article storage locker and take out an article delivered to him, from the locker.

The above-mentioned system can receive and store delivered articles for residents 24 hours a day. This system is very useful for residents who are out frequently or too busy to receive delivered articles. The system is also useful for delivery service persons who deliver articles early in the morning and late at night.

With this conventional system, however, communication is necessary between a delivery service person and a janitor or a neighbor when issuing receipts and delivery notices. Complete storage and transfer of delivered articles are thus troublesome and problems are apt to occur.

Although giving accurate instructions to each delivery service person is necessary so that he can conduct delivered article entering and storage work easily and speedily and so that he does not forget closing the door, the above-mentioned conventional system has no means for giving such instructions. Therefore, the delivery service person is confused in his work, resulting in lower efficiency. This may lead to delivery errors and forgetting of door closing, and these problems may cause thefts.

SUMMARY OF THE INVENTION

An object of the present invention is, accordingly, to provide a delivered article storage control system which allows delivery service persons to easily and accurately issue receipts and delivery notices, and can control entering and storage processes including a receipt issuing process efficiently and securely.

Another object of the present invention is to improve the efficiency of delivery service, to promote protection of the privacy of residents and to prevent thefts.

To achieve the above-mentioned objects, the delivered article storage control system of the present invention comprises a control box equipped with an interactive communication unit, a receipt issuing printer, an instruction display and/or an audio message output speaker, an identification card reader, a monitor display for a burglar detection camera and an input keyboard, and a delivered article storage box equipped with a plurality of lockers, each of which is equipped with a door which can be opened when an identification card is entered into the card reader and an article presence/absence detection sensor, wherein the two boxes and the burglar detection camera are installed in a visitor reception room, the interactive communication unit for the above-mentioned interactive communication unit and the monitor display for the above-mentioned burglar detection camera is installed in a control room and the rooms are connected to each other via a telephone line, and a control unit is further provided to control the burglar detection camera, printer, instruction display and/or speaker, monitor display and card reader so that the identification card entered into the reader can be read and so that the door of the corresponding locker is opened/closed according to the information stored on the card.

With the present invention having the above-mentioned structure and features, when an article is delivered to a resident who is not at home, a delivery service person can operate the control unit by pressing the keys to activate the instruction display and/or speaker, burglar detection camera and monitor display. The corresponding room number, sender's code number, condition of the locker, condition of the door and the instructions for various processes, such as a receipt issuing process, to be conducted by the delivery service person are indicated on the instruction display according to the predetermined order, and/or the above-mentioned instructions are output from the speaker using audio messages. The delivery service person selectively operates the input keys while interacting with the instructions on the instruction display and/or responding to the audio messages in order to open the corresponding door and entering a delivered article into the specified locker. The printer is then activated by a detection signal from the article presence/absence detection sensor and issues a receipt and a delivery notice indicating the corresponding delivery date, locker number, room number, etc. After receiving these notices, the delivery service person receives and enters the delivery notice into the mail box of the receiver and brings back only the receipt.

When the resident returns, he finds the delivery notice in his mail box. He then puts his identification card into the card reader to be confirmed by the control unit that he is a true resident. He can then open the door of the locker and take out the delivered article from the locker.

As described above, delivered articles can be transferred from delivery service persons to residents who are out, without the help of any third person, such as a janitor. Receipts and delivery notices can be issued when the control unit is operated by the delivery service person. In this way, complete delivery is possible easily and accurately.

Instructions for operations to be conducted by a delivery service person are accurately transmitted to the delivery service person from the instruction display and/or the speaker using audio messages. The delivery service person can thus conduct his work accurately and efficiently without any confusion.

The card slot of the card reader can be provided on both the front and rear sides of the control box. In addition, the door of each locker can be provided on both the front and rear sides of the storage box so that the front sides of both the control and storage boxes are exposed outside the building and the rear sides are exposed inside the building.

With this structure, the delivery service person can conduct his work only outside the building. The resident can take out an article delivered to him inside or outside the building. It is not necessary for the delivery service person to enter the building to store the delivered article. The resident is not required to go outside the building to take out the delivered article. This feature is convenient when it rains. Therefore, sufficient crime prevention and privacy protection means are implemented by limiting free entry of nonresidents and delivery service persons into the building. Nevertheless delivery service persons can store delivered articles efficiently without any troublesome procedure. In this way, this system ensures rationalized transfer of delivered articles and is beneficial for both delivery service persons and residents.

BRIEF DESCRIPTION OF THE DRAWINGS

FIG. 2 is a block diagram of the system shown in FIG. 1, FIGS. 3 (A) and 3 (B) are flowcharts illustrating the procedure for entering a delivered article and the procedure for taking out a stored article.

DETAILED DESCRIPTION OF THE INVENTION

Figure 1:
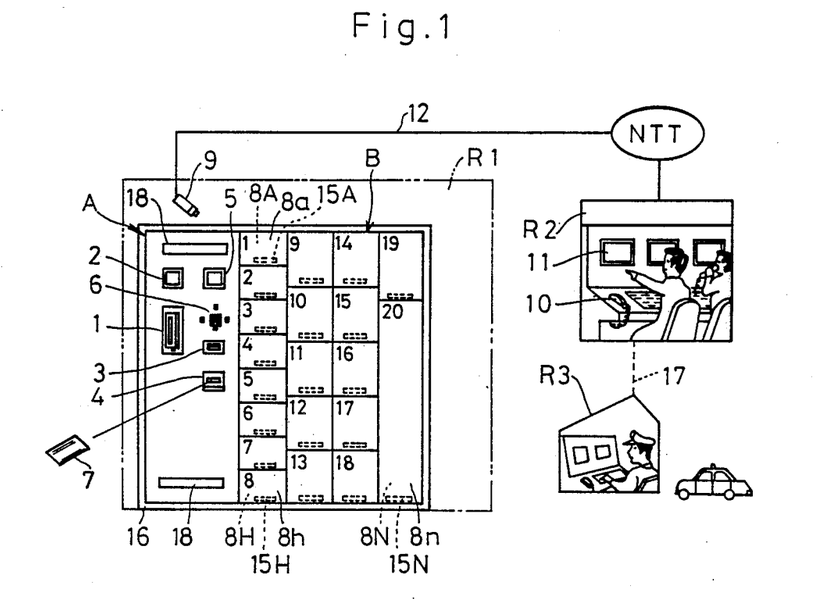
FIG. 1 is a schematic diagram of an embodiment of the present invention's system.
Figure 2:
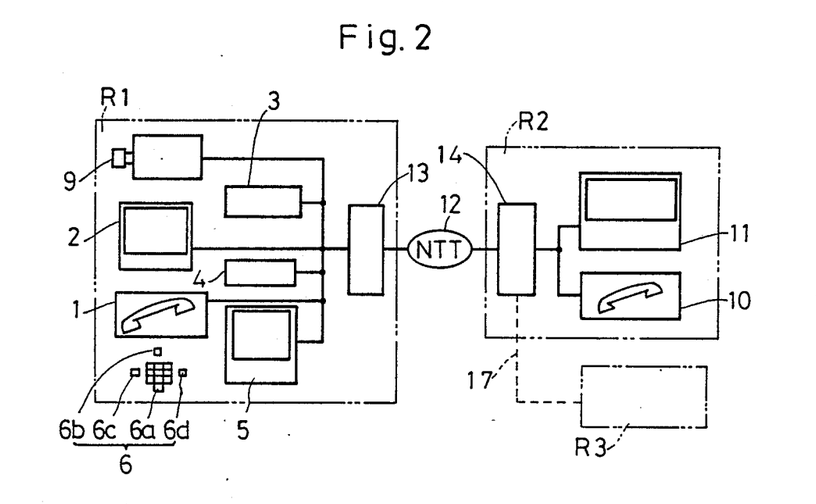

An embodiment of the present invention is described referring to FIGS. 1 and 2. Letter A represents a control box. The control box is composed of a transmitter/receiver 1, a monitor display 2, a printer 3 for issuing receipts and delivery notices and a card reader 4 which reads an identification card 7 (a magnetic card for example), an instruction display 5 which interactively gives delivered article entering instructions to delivery service persons and delivered article taking-out instructions to receivers, an interactive input keyboard 6 including number keys 6a, a start key 6b, a confirmation key 6c and a correction key 6b. These devices are arranged ergonomically. The control box A includes a CPU, I/O ports, drivers (not shown), etc. as control devices used to control various operations. Vents 18 are provided close to the top and bottom of the control box A on its front side to radiate heat.

Letter B represents a delivered article storage box. Various types of box units, for example five-, eight- or two-stacked types with the standard width as well as wider four-stacked types, are combined horizontally as required to accommodate delivered articles of various sizes and shapes. The storage box has a plurality of delivered article storage lockers 8A, 8B, ..., 8N equipped with doors 8a, 8b, ..., 8n (on the front sides of the lockers) which can be opened when the identification card 7 is entered into the card reader 4. Serial locker numbers are provided on the front sides of the lockers. Delivered article presence/absence detection sensors 15A, 15B, ..., 15N are provided in the received article storage lockers 8A, 8B, ..., 8N to detect presence/absence of delivered articles. When no article is detected and the detection signal is turned off, the instruction display 5 indicates that the corresponding locker is empty. When a delivered article is entered and the detection signal is turned on, a printing instruction is transmitted to the printer 3. The doors 8a, 8b, ..., 8n are all equipped with autolock mechanisms (not shown). When the identification card 7 is entered into the card reader 4, the lock mechanism of the corresponding door is automatically unlocked through the control by the CPU.

The control box A and the delivered article storage box B are equal in height and depth. As shown in FIG. 1, the control box A and the delivered article storage box B are combined horizontally close to each other and accommodated in a frame 16. A monitor display camera 9 is located above on the front side of the system. For example, the camera 9 is installed on the wall of a visitor reception room R1, such as the entrance hall of a condominium.

A control room R2 is equipped with a receiver/transmitter 10 which communicates with the transmitter/receiver 1, a monitor display 11 which receives signals from the monitor display camera 9 and, when required, a video tape recorder (not shown).

Figure 3:
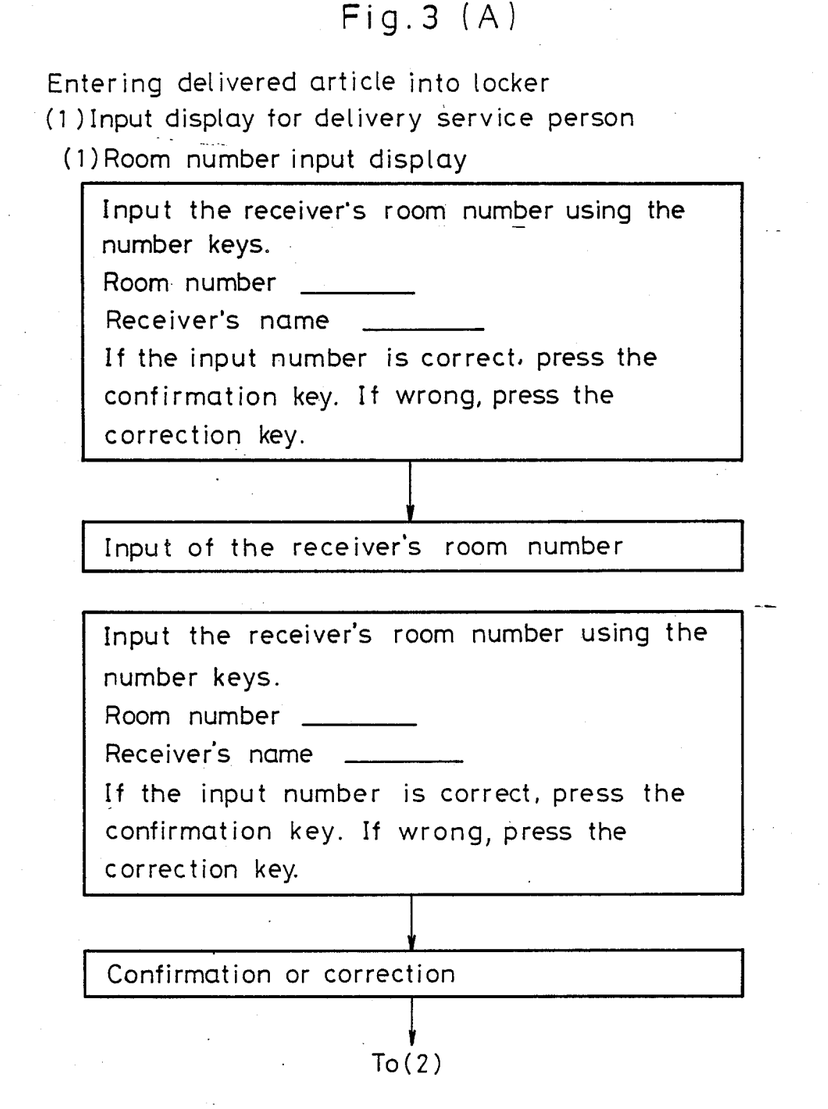
Figure 3B:
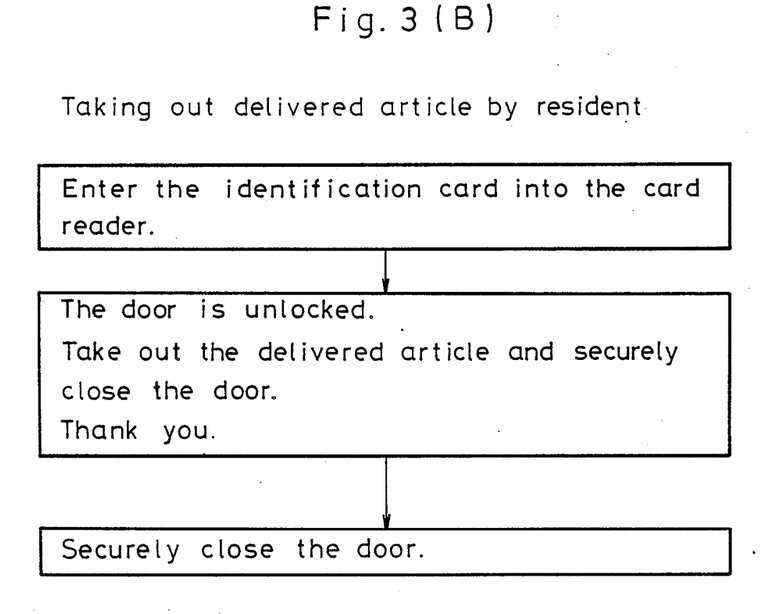

The monitor display camera 9, the monitor display 2, the transmitter/receiver 1, the printer 3, the card reader 4, the instruction display 5 and the delivered article presence/absence detection sensors 15A, 15B, ..., 15N are connected to a transmitter 13 on the reception room R1 side. A receiver 14 is connected to the receiver/transmitter 10 and the monitor display 11 on the control room R2 side. The transmitter 13 is connected to the receiver 14 via a telephone line 12. The control room R2 is connected to a security company R3 via an exclusive line 17. The operation procedures and functions of the system with the above-mentioned structure are as described above. FIG. 3 (A) is a flowchart indicating the delivered article entering procedure to be conducted by a delivery service person through interaction using the instruction display 5 and the input keyboard 6. FIG. 3 (B) is a flowchart indicating the delivered article taking-out procedure to be conducted by a resident.

The box units of the above-mentioned storage box B can have various combinations other than those shown in FIG. 1. Since two box units adjacent to each other are connectable using approximately three bolts and nuts installed vertically, the combination of the box units can be changed easily.

Figure 4:
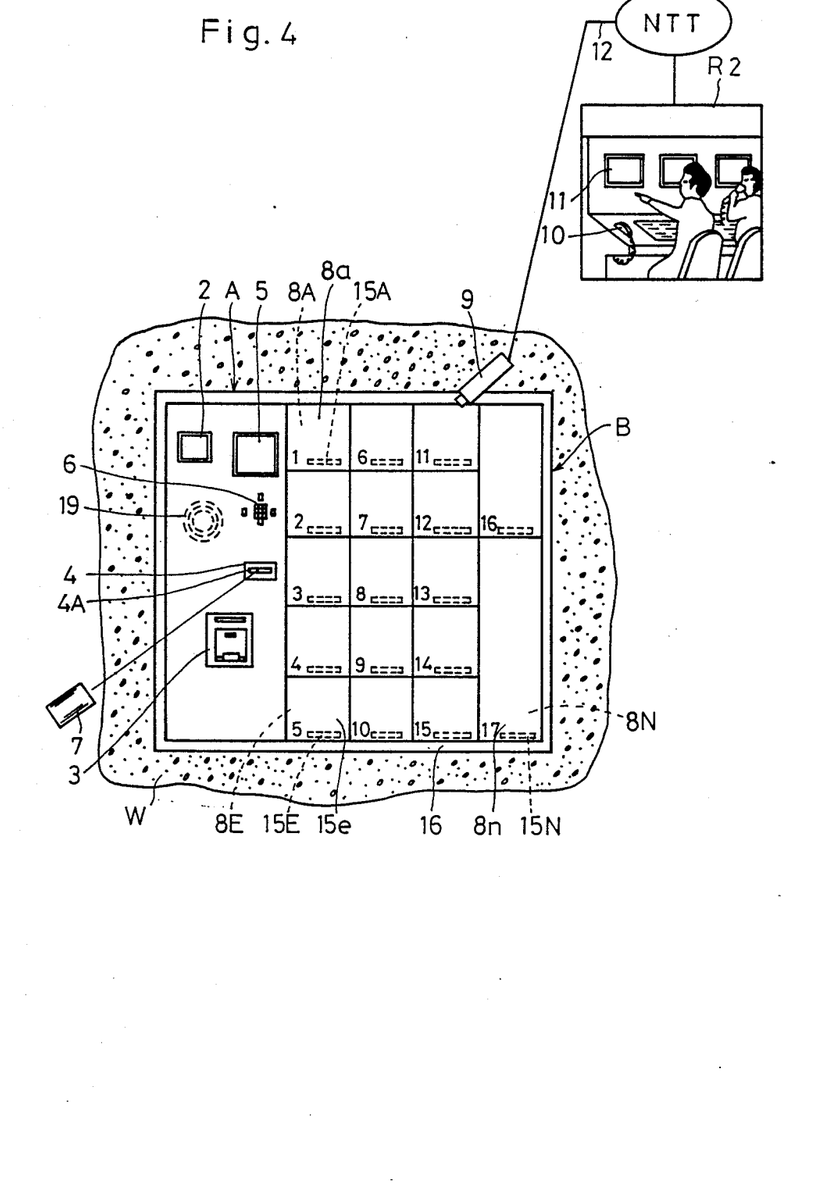
FIG. 4 is a front view of a schematic diagram illustrating another embodiment of the present invention's system.
Figure 5:
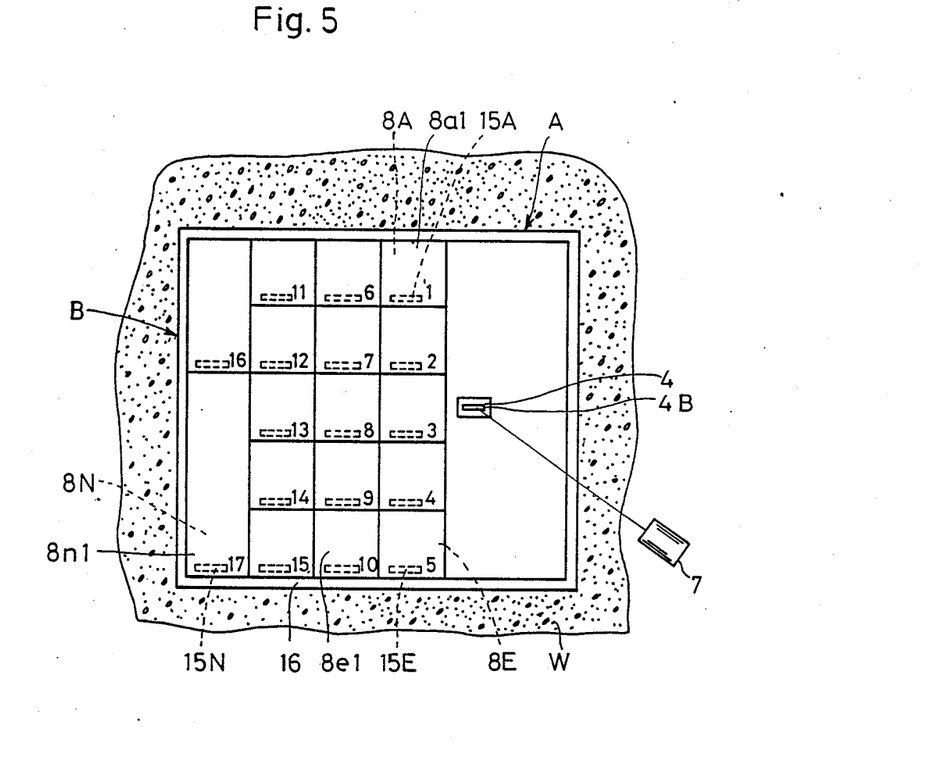
FIG. 5 is a rear view of the embodiment shown in FIG. 4.

FIG. 4 is a front view of a schematic diagram illustrating another embodiment of the present invention's system, and FIG. 5 is a rear view of the embodiment shown in FIG. 4. Unlike the embodiment shown in FIGS. 1 and 2, the embodiment shown in FIGS. 4 and 5 is equipped with a speaker 19 which generates audio messages to give delivered article entering instructions corresponding to the instructions indicated on the instruction display 5.

The speaker 19 is on the front side of the control box A. In addition, the card reader 4 has two card slots 4A and 4B on the front and rear sides of the control box A. Furthermore, the delivered article storage lockers 8A, 8B, ..., 8N are equipped with doors 8a, 8b, ..., 8n on the front side of the storage box B and the corresponding doors 8a1, 8b1, ..., 8n1 on the rear side. The devices other than those described above are the same as those of the embodiment shown in FIGS. 1 and 2 and not described here again. Like reference numbers in the figures designate like devices.

Figure 6:
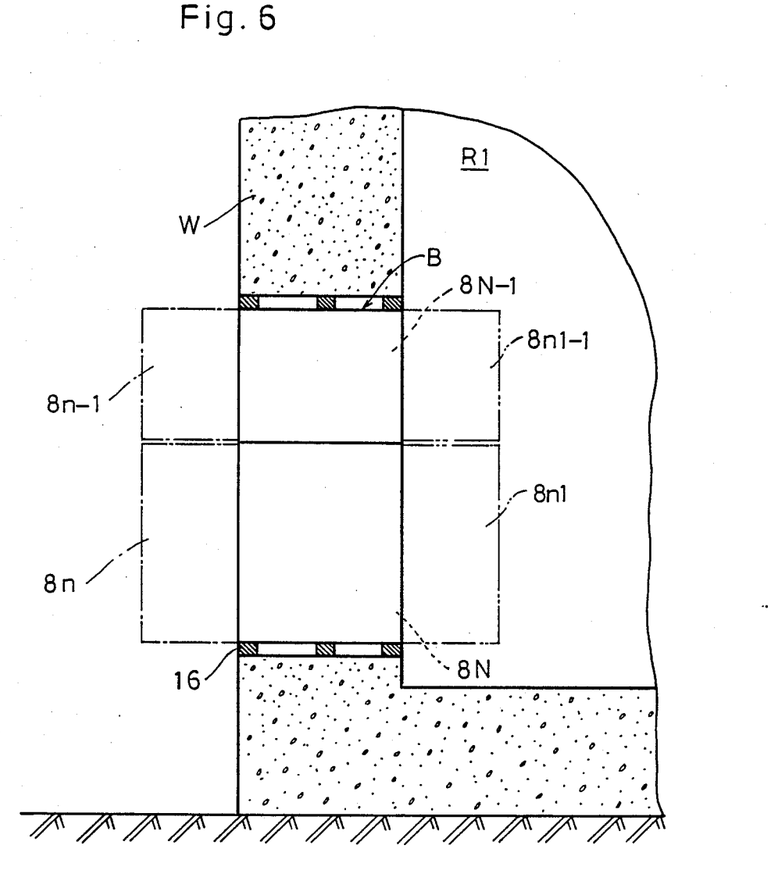
FIG. 6 is a schematic vertical sectional view illustrating the installation condition of the embodiment shown in FIG. 5.

In the case of the above-mentioned second embodiment, as shown in FIG. 6, the monitor display 2, the printer 3, the instruction display 5, the input keyboard 6, the speaker 19 and the card slot 4A are exposed outside the wall W of the entrance hall 2 of a condominium for example, and the other card slot 4B is provided inside the wall. With this structure, a delivery person can conduct his work outside the wall without entering the building. A resident can take out an article delivered to him both inside and outside the building. When it rains for example, the resident is not required to go out from the building.

In addition to the instructions shown in FIGS. 3 (A) and 3 (B) and indicated on the instruction display 5, notices stating system abnormality and receipt sheet exhaustion can also be generated.

The transmitter/receiver 1 provided as an example of an interactive device of the embodiment shown in FIGS. 1 and 2 can be eliminated.

Either the instruction display 5 or the speaker 19 provided in the embodiment shown in FIGS. 4 and 5 audio messages from the speaker 19 can be eliminated.

I claim:

1. A delivered article storage control system comprising a control box equipped with a receipt issuing printer, an instruction display and/or an audio message output speaker, an identification card reader, a monitor display for a burglar detection camera and an input keyboard, and a delivered article storage box equipped with a plurality of lockers, each of which is equipped with a door which can be opened when an identification card is entered into said card reader and an article presence/absence detection sensor, wherein said two boxes and said burglar detection camera are installed in a visitor reception room, said monitor display for said burglar detection camera is installed in a control room and said two rooms are connected to each other via a telephone line, and a control unit is further provided to control said burglar detection camera, printer, instruction display and/or speaker, monitor display and card reader so that said identification card entered into said card reader can be read and so that said door of said corresponding locker is opened/closed according to the information stored on said card.

2. A delivered article storage control system according to claim 1, wherein said control room is connected to a security company via an exclusive telephone line.

3. A delivered article storage control system according to claim 1, wherein said control unit is a CPU.

4. A delivered article storage control system according to claim 3, wherein said control and storage boxes are installed in the side wall of said visitor reception room of a building so that the front sides of said boxes are exposed outside said building and the rear sides of said boxes are exposed inside said building.

5. A delivered article storage control system comprising a control box equipped with a receipt issuing printer, an instruction display and/or an audio message output speaker, an identification card reader, a monitor display for a burglar detection camera and an input keyboard, and a delivered article storage box equipped with a plurality of lockers, each of which is equipped with a door which can be opened when an identification card is entered into said card reader and an article presence/absence detection sensor, wherein said printer, instruction display and/or speaker, burglar detection camera, monitor display and input keyboard are provided on the front of said control box, said card reader has two card slots on the front and rear sides of said control box, and said delivered article storage lockers of are equipped with said doors on the front and the rear sides of said storage box.

* * * * *